Patented Nov. 15, 1949

2,487,824

UNITED STATES PATENT OFFICE 2,487,824

CATALYTIC CONVERSION OF HYDROCARBONS

George Alexander Mills, Swarthmore, Pa., assignor to Houdry Process Corporation, Wilmington, Del., a corporation of Delaware No Drawing. Application December 12, 1946, Serial No. 715,645

8 Claims. (Cl. 196—52)

The present invention relates to catalytic hydrocarbon conversion processes and is particularly directed to improvements in such processes obtained by the use therein of specially prepared clay catalysts of improved heat stability.

Catalysts prepared from acid activated clays such as acid activated sub-bentonite clays of the montmorillonite type have been widely and successfully employed in commercial operations for cracking and other treating of hydrocarbons. These catalysts are generally prepared by methods including treatment of raw clay at elevated temperatures with mineral acid for an extended period, effecting desired activation. The thus prepared clay, after suitable washing with water and drying, is commercially available as "acid-activated clay" which has a variety of industrial uses, but for use as a catalyst in hydrocarbon conversion process it is often but not necessarily formed into pellets which may be calcined at temperatures above about 900° C.

In the use of these activated clays and other catalysts in conventional operations such as cracking of hydrocarbons, the solid catalyst is contacted for a fixed period with the hydrocarbon charge stock generally in vapor form and at a high temperature in the order of about 750 to about 1000° F., as a result of which desired conversion products are formed from the charge stock while a hydrocarbonaceous deposit called "coke" accumulates on the catalyst. In order to maintain the efficiency of the catalyst, the coke is removed by subjecting the catalyst repeatedly at suitable intervals to regeneration by contact with an oxidizing gas at an elevated temperature, usually below 1100° F., although higher temperatures may at times be encountered in localized zones.

In systems of hydrocarbon conversion employing a fixed bed of catalyst, the alternate use and regeneration is carried out with the catalyst in place, by periodically diverting the flow of charge stock and contacting the catalyst with hot air or other regenerating gases. In other systems, the catalyst is continuously circulated from the reaction vessel or zone to a regenerating vessel or zone, the catalyst being in the form of a compact moving bed or freely falling mass or suspended as finely divided particles in a fluid medium. In any of these systems the alternate use and regeneration of the same catalyst in practical operations can be repeated over a large number of times, however, the average over-all activity of the mass of catalyst becomes progressively lowered so that it is necessary in such operations to replace the catalyst with unused catalyst of higher activity to maintain the desired average activity. In circulating catalyst systems this replacement is accomplished by adding a determined quantity of unused catalyst to replace a portion of used catalyst withdrawn from the system, whereas in fixed catalyst bed operations it is the usual practice to replace the entire batch of catalyst after it has become sufficiently reduced in efficiency by continued use over a prolonged period. It will be readily seen that in either event, the amount or frequency of "make-up" or replacement of catalyst constitute important factors in determining the costs of operation.

It has been observed by sampling and testing of used catalyst withdrawn from various systems after use therein over different periods, that a substantial proportion of the catalyst has the appearance and properties of catalyst that has been subjected to deleterious influences including high temperatures, as evidenced particularly by an increased density, loss of porosity, and materially depreciated catalytic activity. That portion of the catalyst showing these effects apparently has encountered during its use in the system, in addition to the ordinary adverse influences of deleterious materials that may be present during reaction and regeneration, high temperatures at levels which immediately on short contacting periods or cumulatively on repeated use exert an adverse effect on the catalyst.

I have found that the thermal stability of acid-activated clay catalyst is materially improved by subjecting the catalyst to a treatment including calcination in air in the absence of any substantial amount of water vapor followed by a mild treatment with acid, in the recited sequence. Thus, in accordance with the present invention, important improvements are provided in hydrocarbon conversion processes in which active clay catalysts are employed at elevated temperatures, such as processes of cracking and reforming of hydrocarbons, by the use of these specially treated acid-activated clay catalysts having improved stability at high temperatures. The improved catalysts used in accordance with the present invention are significantly more stable at high temperatures which cause rapid shrinkage of the ordinary acid-activated clay catalysts of the sub-bentonite type. Since the original densities and porosities are better retained by the improved catalyst, the desired high level of catalytic activity is consequently better maintained.

The catalysts of the invention may be prepared from any commercially available acid-activated sub-bentonite clay or by starting with raw montmorillonite type clays and initially subjecting such clays to acid activation in conventional manner as is practiced in the preparation of active catalysts or oil decolorizing adsorbents from these clays. Thus, the raw clay may be treated in dry finely divided form or in an aqueous slurry with a mineral acid such as sulfuric or hydrochloric, preferably at elevated temperatures. The manner in which the acid treatment is carried out to effect the required activation is immaterial to the present invention. Such methods as are described, for instance, in U. S. Patents 1,397,113, 1,579,326, 1,731,702, and 1,739,734 are suitable for the initial preparation of the acid activated clay, to be subjected to further treatment as hereafter described. Generally it is preferred to effect activation by treatment with sulfuric acid in the proportion of .20 to .40 part by weight of acid (100% basis) to the dry weight of the clay (105° C. basis), diluted with water to a concentration of 10 to 50% based on total water content of the mix including that present in the clay. Temperatures in the range of about 180° F. up to about the boiling point of the acid treating solution are preferably employed, but if desired, even higher temperatures may be employed with compensating modification of pressure.

The duration of the treatment will be governed largely by the quantity of acid and the temperature employed, and in the indicated range will require about 4 to 8 hours. It may be stated generally that the required extent of activation is obtained when the conditions are chosen to effect the removal of about 20% to about 40% by weight of the aluminum content of the raw clay on a dry basis. Following this acid treatment, the clay is preferably washed to remove at least a major part of the adhering acid, and dried at moderate temperatures.

The clay so prepared, or after further grading or pulverizing, may be employed as a catalyst or adsorbent in this form, but for fixed bed and compact moving bed hydrocarbon conversion operations particularly, it is generally preferred to employ catalyst in the form of larger aggregates prepared for instance by extruding or other methods of molding. In accordance with the preferred procedure, therefore, the finely divided acid activated clay is admixed with water in a required amount for suitable extrusion, and the obtained mix extruded into rods which are cut into cylindrical pellets generally of about 2 to 4 mm. in size. In the usual preparation of catalyst, whether it is to be employed in powder form or as the indicated pellets or other molded units, it is advantageous to subject the clay to calcination before introducing the catalyst into the conversion system, by heat treatment at a temperature above about 1000° F.

In order to obtain the desired improvement in heat stability in accordance with the present invention, the acid-activated clay catalyst prepared as above described, or any commercial acid-activated clay of the sub-bentonite type, is subjected to a mild acid treatment following calcination. Thus, the acid-activated clay may be subjected to calcination preferably for 2 to 5 hours at a temperature of about 1000° F. or above but should not reach temperatures which detrimentally affect catalytic activity, which for this type of clay generally occurs in the approximate range of 1425 to 1525° F. Extension of the treatment time at any temperature below the indicated maximum, appears to have no detrimental effect; treatment at 1350° F. for 2 hours, 10 hours or 20 hours resulted in catalysts of practically similar activities. To obtain catalysts of highest initial activity the required calcination is preferably carried out in the substantial absence of water vapor, and in the presence of gases inert with respect to the catalyst such as nitrogen, oxygen, or dried air. If atmospheric air is to be employed for this purpose, the same should be initially dried before contact with the clay being treated. The moisture in the treating medium is preferably maintained as low as is practically possible, as below 0.3 pound per square inch partial pressure of water vapor. In order to maintain the atmosphere surrounding the catalyst free from water vapor, it is advantageous to flow the heated dried air or other dry treating gas over the catalyst at a velocity sufficient to sweep out water vapor that may be released from the catalyst mass, particularly during the initial stages of the treatment when the concentration of water vapor may be highest.

The catalyst subjected to the preparatory calcination treatment may be in finely divided form, but it is preferred to have the same in the form of larger aggregates or pieces such as extruded pellets or other molded bodies of suitable size and shape for catalytic use. Where the present stabilizing treatment is to be carried out on an already acid-activated clay procured from commercial sources, the recited calcination step may, in some instances, not be required if the obtained clay has already received a similar calcination treatment. Inasmuch, however, as such calcined material may have adsorbed substantial quantities of moisture during the period since its previous calcination, it is preferred to perform the indicated calcination regardless of any previous heat treatment to which the clay may have been subjected.

The previously calcined clay, or one which has been recalcined as indicated above, after having been cooled to room temperature, is now subjected to mild treatment with dilute mineral acid. This treatment is carried out preferably at room temperature and not substantially in excess of about 140° F. The acid concentration, temperature, and contact time are chosen so that very little of the alumina is extracted from the clay. The concentration of the acid may be in the range of 5 to 20% by weight of solution and may be in an amount of substantially equal portions by volume of dilute acid and clay being treated. The treatment is effected in a period of about 10 hours or less with warmer acid within the described range, but it is preferred to employ acid at substantially room temperature for about 24 hours. Any mineral acid may be employed such as hydrochloric or sulfuric or the more highly ionized of the organic acids such as acetic or oxalic.

Following the mild acid treatment above, the clay catalyst is washed with water and dried and may then be subjected further to any known or desired heat treatment or steam treatment for conditioning the catalyst to desired activity.

*Example*

A commercial acid-activated sub-bentonite clay was employed having the following composition (105° C. basis) by weight:

| | Per cent |
|---|---|
| Ignition loss | 6.63 |
| Si (as $SiO_2$) | 63.29 |
| Al (as $Al_2O_3$) | 15.36 |
| Fe (as $Fe_2O_3$) | 1.79 |
| Ca (as CaO) | 2.92 |
| Mg (as MgO) | 4.28 |
| Total alkali (as $Na_2O$) | 0.16 |
| $SO_4$ | 4.49 |

Pellets of the above clay were calcined in dried air at 1500° F. for 2 hours, then permitted to cool to room temperature. The cooled pellets were treated for a period of 24 hours with a quantity of 15% HCl sufficient to cover the pellets; the acid then drained, and the pellets washed and dried.

The improved stability of the catalyst so prepared will be evident from the following comparison with the original commercial acid-activated clay catalyst which had not been so treated.

of .65 to .70 and 50% to 55% porosity indicate further the enhanced stability of the catalyst imparted by the described novel treatment of the present invention.

Although the particular commercial acid-activated clay compared in the above table was found to be fairly stable at 1500° F. in a two hour treatment, other samples of commercial acid-activated sub-bentonite clays already show decided deactivation and shrinkage at this temperature. For most commercial clays of this type tested, uniformly high activity was obtained by calcination in flowing dried air at a temperature of 1350 to 1400° F. with only minor variations somewhat below this range as at 1000 to 1300° F. or above this range until temperatures approaching or exceeding 1500° F. were reached. Accordingly, in selecting the proper calcination temperature to be employed preceding the proposed mild acid treatment of the invention the designated range of 1350 to 1400° F. may be safely followed, while greater care should be exercised in the selection of temperatures approaching or exceeding 1500° F., which are not advised if such temperature in a two hour treatment effects as much as a 20 to 25% reduction in activity of the particular clay

| Catalyst | Heat Test | Apparent Bulk Density | Vol. Percent Porosity | "Cat-A" Yields | | | |
|---|---|---|---|---|---|---|---|
| | | | | Gasoline | Coke | Gas | Grav. |
| Original Commercial acid-activated clay pellets | 1600° F., 2 hrs. | .95 | 26.8 | 11.2 | 0.4 | 1.2 | 1.05 |
| Same pellets after treatment by Example I | 1600° F., 2 hrs. | .78 | 47.5 | 28.9 | 1.3 | 3.2 | 1.33 |

The activity figures in the above table represent the volume per cent of gasoline obtained on cracking a selected light gas oil fraction in accordance with the "CAT-A" method described in "Laboratory method for determining the activity of cracking catalysts" by J. Alexander and H. G. Shimp in National Petroleum News, Technical Section, August 2, 1944, pages R-537 and 538. In accordance with the test therein described a standard light gas oil is contacted with the catalyst at a temperature of 800° F., at atmospheric pressure and at a liquid space rate of 1.5 (volume of liquid charge per volume of catalyst per hour) for a period of 10 minutes. The yield of motor gasoline of 410° F. cut point is measured and expressed as a per cent of the volume of oil charged. The quantity of gas formed and the amount of coke deposited in the catalyst are also measured and expressed in terms of weight per cent of charge. Designation of catalyst activity wherever employed in the present specification has reference to this test.

The volume per cent porosity shown in the above table indicates the measured volume of water absorbed by a pellet of measured volume substantially in accordance with the standard ASTM method (D116-39; Porosity, Method A).

As seen from the above table, whereas the same clay catalyst without the novel mild acid treatment following calcination of the present invention was materially deactivated to less than 15% gasoline (by "CAT-A" test) at a temperature of 1600° F., the treated catalyst of Example I under the same high temperature conditions still retained a fairly high level of catalytic activity of over 25% gasoline. The comparatively small change in bulk density and porosity measurements as compared with the original bulk density as compared with its activity when treated in the preferred range.

The catalyst prepared or treated in accordance with the present invention may be employed in the cracking of light gas oils, as well as in so-called reforming operations including the treatment of gasoline or heavier naphtha fractions, particularly catalytically or thermally cracked gasoline, to lower the acid heat and to increase lead susceptibility and/or octane rating and other performance characteristics. The unusually low percentage of coke produced by the catalyst of Example I, as shown by the above table, renders the catalysts of the invention particularly desirable for cracking of heavy petroleum stocks such as those having a mid-boiling point of above 650° F.

In the use of catalyst in accordance with the present invention the usual conditions of cracking can be availed of if desired without modification, the catalyst being in the form of fine particles, granules, globules, pellets or the like. The described improved catalyst can be employed in fixed bed processes for cracking of petroleum fractions as well as in processes in which the catalyst moves or is moved through the reaction zone. As an example of a fixed bed operation, cracking may be carried out at a temperature of 800 to 900° F., employing a space rate (volume of charge liquid basis per volume of catalyst per hour) of about 1.5 and a pressure of about 15 pounds per square inch gauge. The temperature, of course, may be varied within the range of from about 700° up to about 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes alternating with regeneration periods. In commercial operation temperatures above 750° F. are preferred. Steam may be added to the charge stock and is particularly advantageous in assisting the vaporization of heavier stocks.

In processes other than the fixed bed, such as where the catalyst moves through the reaction zone, the conditions employed may be such as to subject the oil to substantially equivalent conditions including contact time and ratios of oil to catalyst as those set out above in connection with the fixed bed process.

A virgin or cracked gasoline or naphtha fraction can be improved in quality by contact with the catalyst under conditions similar to those employed in cracking.

Whereas in the fixed bed operation the catalyst is alternately subjected to regeneration, in the other processes the catalyst is passed during its cycle through a separate regeneration zone. In all of these processes regeneration is effected by contacting the catalyst after use, with air or other oxygen-containing gas to burn off carbonaceous deposit.

Because of the improved heat stability of the catalyst treated in accordance with the present invention, it is not only possible to carry out more economically the above designated hydrocarbon conversion operations under the conditions usually employed, because of the reduced degradation of the catalyst and consequent longer useful life, but it becomes possible if desired, to materially step up the severity of the operating conditions to higher levels, without thereby causing accelerated deterioration of the catalyst because of the higher regeneration temperatures ensuing.

Obviously many modifications and variations of the invention as hereinbefore set forth may be made without departing from the spirit and scope thereof and therefore only such limitations should be imposed as are indicated in the appended claims.

I claim as my invention:

1. In processes for catalytic conversion of hydrocarbons employing cracking catalysts, the improvement which comprises contacting said hydrocarbons under catalytic cracking conditions with an active catalyst comprising an acid-activated montmorillonite clay of improved thermal stability imparted thereto as a result of pretreatment during initial preparation of the catalyst from said clay, said pretreatment including calcination of the acid-activated clay in substantial absence of water vapor at a temperature in excess of 1000° F. followed by mild acid leaching of the calcined clay.

2. Process in accordance with claim 1 in which the stated mild conditions of acid treatment comprise temperatures not in excess of 140° F.

3. Process in accordance with claim 1 in which the stated mild conditions of acid-treatment comprise substantially room temperature and contact time of about 24 hours.

4. Processes in accordance with claim 1, in which the calcination is effected in flowing dried air at a temperature in the range of about 1350 to 1400° F. for a period of not less than 2 hours.

5. The method which comprises subjecting a hydrocarbon charge stock of a boiling range higher than gasoline to catalytic cracking conditions in contact with a catalyst comprising an acid-activated montmorillonite clay of improved thermal stability, said clay having been subjected during its initial preparation and prior to contact with hydrocarbons to a process including the steps of calcining the acid-activated clay for at least 2 hours at a temperature in the range of 1000° F. to about 1500° F. in substantial absence of water vapor, followed by leaching the calcined clay at mild temperature with a solution of mineral acid containing not more than 20% acid per weight of the solution.

6. The method in accordance with claim 5 in which the stated calcination is effected in flowing dried air containing if at all less water vapor than that corresponding to 0.3 pounds per square inch partial pressure.

7. The method in accordance with claim 5 in which said hydrocarbon charge stock is a heavy petroleum fraction having a mid-boiling point above 600° F.

8. The process of cracking petroleum hydrocarbons which comprises subjecting said hydrocarbons to contact under catalytic cracking conditions with a pelleted acid-activated montmorillonite clay catalyst having the property of retaining a "CAT-A" activity of over 25% gasoline when subjected to heat treatment at 1600° F. in dried air for 2 hours, said catalyst being initially prepared for use by a treatment comprising calcination of the pelleted acid-activated clay in an unused state in an atmosphere substantially free of water vapor followed by leaching of the calcined clay with dilute acid at substantially room temperature.

GEORGE ALEXANDER MILLS.

REFERENCES CITED

The following references are of record in the file of this patent:

UNITED STATES PATENTS

| Number | Name | Date |
| --- | --- | --- |
| 1,796,107 | Jonas | Mar. 10, 1931 |
| 2,307,795 | Kearby | Jan. 12, 1943 |
| 2,344,103 | Ocon et al. | Mar. 14, 1944 |
| 2,377,092 | McGrew | May 29, 1945 |
| 2,388,735 | Gary et al. | Nov. 13, 1945 |
| 2,397,505 | Richardson | Apr. 2, 1946 |
| 2,414,736 | Gray | Jan. 21, 1947 |
| 2,440,756 | Oulton | May 4, 1948 |